(12) United States Patent
Ranganath

(10) Patent No.: US 7,747,174 B2
(45) Date of Patent: *Jun. 29, 2010

(54) MULTI-CHANNEL FABRY-PEROT LASER TRANSMITTERS AND METHODS OF GENERATING MULTIPLE MODULATED OPTICAL SIGNALS

(75) Inventor: Tirumala R. Ranganath, Palo Alto, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 1410 days.

This patent is subject to a terminal disclaimer.

(21) Appl. No.: 10/936,057

(22) Filed: Sep. 8, 2004

(65) Prior Publication Data

US 2006/0051103 A1 Mar. 9, 2006

(51) Int. Cl.
*H04B 10/04* (2006.01)
(52) U.S. Cl. .................... 398/183; 398/182; 398/66; 398/68; 398/71; 372/26; 372/50; 372/29.02
(58) Field of Classification Search ............. 398/182, 398/183, 184, 186, 192, 193, 195, 196, 197, 398/198, 199, 200, 201, 185, 187, 188, 189, 398/190, 191, 194, 79, 82, 66, 68, 70, 71; 372/50, 26, 29.02; 359/344, 337.4, 245, 359/254
See application file for complete search history.

(56) References Cited

U.S. PATENT DOCUMENTS

| | | | |
|---|---|---|---|
| 4,953,935 A | 9/1990 | Suchoski et al. | |
| 5,040,863 A | 8/1991 | Kawakami et al. | |
| 5,463,705 A | 10/1995 | Clauberg et al. | |
| 5,608,565 A | 3/1997 | Suzuki et al. | |
| 5,631,758 A * | 5/1997 | Knox et al. ............ | 398/75 |
| 5,663,822 A * | 9/1997 | Fee ....................... | 398/95 |
| 5,663,824 A | 9/1997 | Koch et al. | |

(Continued)

FOREIGN PATENT DOCUMENTS

JP 04099081 3/1992

(Continued)

OTHER PUBLICATIONS

Weinmann, et al., "Polarization-Independent and Ultra-High Badwidth Electroabsorption Modulator in Muliquantum-Well Deep-Ridge Waveguide Technology", *IEEE Photonics Technology Letters*, vol. 8, No. 7. Jul. 1996, 891-893.

*Primary Examiner*—Hanh Phan

(57) ABSTRACT

Multi-channel Fabry-Perot laser transmitters and methods of generating multiple modulated optical signals are described. In one aspect, an optical transmitter includes a Fabry-Perot (FP) laser, an optical isolator, an optical splitter, and multiple electroabsorption modulators (EAMs). The FP laser is operable to generate multimode laser light. The optical isolator is arranged to transmit the multimode laser light. The optical splitter has more than one optical output and an optical input that is arranged to receive the multimode laser light transmitted by the optical isolator. Each of the EAMs is operable to modulate a respective laser light output from a respective optical output of the optical splitter. In another aspect, multimode laser light is generated. The multimode laser light is directionally isolated. The directionally-isolated multimode laser light is divided into more than one divided laser light output. Each of the divided laser light outputs is modulated to produce multiple modulated optical signals.

16 Claims, 7 Drawing Sheets

U.S. PATENT DOCUMENTS

| | | | |
|---|---|---|---|
| 5,912,749 A * | 6/1999 | Harstead et al. | 398/75 |
| 6,141,127 A * | 10/2000 | Boivin et al. | 398/92 |
| 6,163,395 A * | 12/2000 | Nemecek et al. | 398/198 |
| 6,275,317 B1 | 8/2001 | Doerr et al. | |
| 6,282,005 B1 * | 8/2001 | Thompson et al. | 398/143 |
| 6,388,782 B1 * | 5/2002 | Stephens et al. | 398/79 |
| 6,597,718 B2 * | 7/2003 | Tanbun-Ek et al. | 372/50.11 |
| 6,747,776 B2 | 6/2004 | Fujii et al. | |
| 6,819,478 B1 * | 11/2004 | Islam | 359/334 |
| 6,842,587 B1 * | 1/2005 | McGhan et al. | 398/201 |
| 6,917,764 B1 | 7/2005 | Wilson | |
| 7,058,098 B1 | 6/2006 | Shay | |
| 7,065,300 B1 * | 6/2006 | Walker | 398/135 |
| 7,224,519 B2 * | 5/2007 | Shin et al. | 359/344 |
| 7,233,433 B1 | 6/2007 | Shay | |
| 7,292,791 B2 * | 11/2007 | Sayyah et al. | 398/182 |
| 7,315,557 B2 * | 1/2008 | Futami et al. | 372/25 |
| 2001/0026565 A1 * | 10/2001 | Takeshita et al. | 372/38.02 |
| 2003/0030888 A1 | 2/2003 | Sakai et al. | |
| 2003/0165173 A1 * | 9/2003 | Helbing et al. | 372/50 |
| 2004/0032646 A1 * | 2/2004 | Koren et al. | 359/344 |
| 2004/0213574 A1 * | 10/2004 | Han et al. | 398/71 |
| 2005/0018732 A1 * | 1/2005 | Bond et al. | 372/50 |
| 2005/0244994 A1 | 11/2005 | Meliga et al. | |
| 2005/0276615 A1 * | 12/2005 | Ranganath | 398/183 |
| 2006/0051103 A1 | 3/2006 | Ranganath | |
| 2006/0215175 A1 | 9/2006 | Yacoubian | |
| 2008/0131141 A1 * | 6/2008 | Ranganath | 398/183 |
| 2008/0219304 A1 * | 9/2008 | Kupershmidt et al. | 372/29.02 |

FOREIGN PATENT DOCUMENTS

| | | | |
|---|---|---|---|
| JP | 04099081 A * | 3/1992 | 372/40 |

* cited by examiner

MULTI-CHANNEL FABRY-PEROT LASER TRANSMITTERS AND METHODS OF GENERATING MULTIPLE MODULATED OPTICAL SIGNALS

BACKGROUND

Multi-channel optical transmitters provide a separate optical output for each of multiple optical communication channels. Multi-channel optical transmitters have been developed that include arrays of lasers, where each laser produces an individually modulatable light output. The light output from each laser may be modulated by direct modulation or external modulation. In a direct modulation approach, the output power of the laser typically is modulated directly by modulating the input drive current to the laser. In an external modulation approach, an external modulator modulates the intensity of light generated by a continuous wave laser in accordance with an information signal.

In one multi-channel optical transmitter approach, the modulated light outputs from the lasers are directly modulated and the modulated light outputs are coupled into respective optical fibers of an optical fiber array. Arrays of vertical cavity surface emitting lasers (VCSELs) and arrays of edge-emitting lasers, such as distributed feedback (DFB) lasers, have been used in these types of multi-channel optical transmitters. Currently, none of these types of multi-channel optical transmitters is capable of operating reliably at a data rate of 20 Giga-bits/second (Gb/s). For example, current VCSEL designs cannot reliably generate directly modulated optical signals at 20 Gb/s due to the high current densities that are required. Similarly, direct modulation of DFB lasers at 20 Gb/s is difficult to achieve. In addition, DFB lasers are extremely sensitive to back-reflections, which broaden the spectral linewidth and increase noise. For this reason, each of the DFB lasers in a multi-channel optical transmitter requires a separate optical isolator to protect the DFB lasers against back reflections, increasing the cost of such a multi-channel optical transmitter.

In another multi-channel optical transmitter approach, the light outputs from the lasers are directly modulated and the modulated light outputs are coupled into a single optical fiber. For example, a wavelength-division multiplexing (WDM) optical transmitter includes an array of lasers, such as DFB lasers, each of which is tuned to produce output light of a different respective wavelength. In order to transmit information over multiple communication channels, each laser in a WDM optical transmitter produces output light within a narrow wavelength range. The different output light wavelengths are combined in an optical coupler and the combined output light is injected into a single optical fiber.

In some multi-channel optical transmitters the light outputs from multiple DFB lasers are externally modulated by respective external electroabsorption modulators. The low chirp characteristics of the external modulators enable these types of multi-channel optical transmitters to achieve data rates of 20 Gb/s and higher. However, integrated arrays of DFB lasers and external electroabsorption modulators are difficult to manufacture and the power requirements of such multi-channel optical transmitters are significantly higher than other designs due to the need to drive both the laser array and the modulator array. In addition, in order to prevent reflections from feeding back into the DFB lasers, the output facet of each electroabsorption modulator typically has a high quality antireflection coating and a separate optical isolator is provided for each DFB laser. A direct active temperature-regulating device also typically is required to compensate for differences between the output wavelength temperature coefficient of the DFB lasers and the absorption edge wavelength temperature coefficient of the electroabsorption modulators. For this and other reasons, such externally modulated multi-channel optical transmitter designs tend to be bulky, expensive, and high in power consumption.

SUMMARY

In one aspect, the invention features an optical transmitter that includes a Fabry-Perot (FP) laser, an optical isolator, an optical splitter, and multiple electroabsorption modulators (EAMs). The FP laser is operable to generate multimode laser light. The optical isolator is arranged to transmit the multimode laser light. The optical splitter has more than one optical output and an optical input that is arranged to receive the multimode laser light transmitted by the optical isolator. Each of the EAMs is operable to modulate a respective laser light output from a respective optical output of the optical splitter.

In another aspect, the invention features a method of generating multiple modulated optical signals. In accordance with this inventive method, multimode laser light is generated. The multimode laser light is directionally isolated. The directionally-isolated multimode laser light is divided into more than one divided laser light output. Each of the divided laser light outputs is modulated to produce multiple modulated optical signals.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An FP laser produces an output that is characterized by a multiple longitudinal mode (or multimode) spectrum over a relatively wide spectral linewidth. The wide spectral linewidths of FP lasers preclude their use in long-haul data transmission applications and in narrow linewidth applications such as WDM. For example, the dispersion of the transmission system for each wavelength within the FP laser spectrum is different, giving rise to material dispersion that spreads the optical signal. In addition, FP lasers are characterized by mode hopping behavior, which gives rise to mode partition noise that causes phase jitter in the optical signal. The spectral linewidths of FP lasers also are too wide to be used in WDM applications without interference between the various longitudinal modes. For these reasons, the use of FP lasers hitherto has been limited to relatively short-distance applications that are not sensitive to chirp and where direct modulation techniques provide sufficient modulation rates.

Each of the optical transmitter embodiments described in detail below includes an FP laser that generates light that is modulated by multiple electroabsorption modulators to produce multiple modulated optical signals. These embodiments are easily scalable to a larger number of optical channels. In addition, implementations of these embodiments include FP lasers that are separate off-the-shelf components that are not integrated with the electroabsorption modulators, and further include only a single optical isolator to protect against the deleterious effects of back reflections. Both of these features significantly reduce the costs of manufacturing the optical transmitters.

In some of the optical transmitter embodiments described in detail below, the structural similarities between FP lasers and electroabsorption modulators are leveraged to enable high-speed optical transmitter designs that exhibit reliable and substantially temperature-independent multi-channel data transmission capabilities over a wide temperature range. These designs therefore can omit direct active temperature regulating devices, such as thermoelectric coolers, which increase fabrication costs and operating costs. In this way, these embodiments enable practical optical transmitter designs that are characterized by high data rate, temperature-independent operation over short and medium distances and potentially lower cost.

Figure 1:
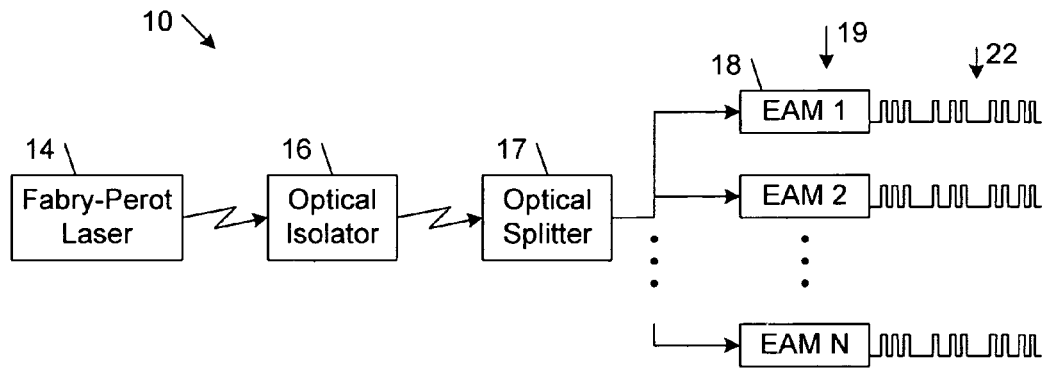
FIG. 1 is a block diagram of an embodiment of an optical transmitter that includes a Fabry-Perot laser, an optical isolator, an optical splitter, and an array of electroabsorption modulators.

FIG. 1 shows an embodiment of an optical transmitter 10 that includes a Fabry-Perot (FP) laser 14, an optical isolator 16, an optical splitter 17, and an array 19 of N electroabsorption modulators (EAMs) 18, where N has an integer value greater than 1. The optical transmitter 10 generates a set of N digital pulse output signals 22 from the light output by a single laser. The output signals 22 are independently encoded by the EAMs 18 in accordance with the data stream (e.g., in accordance with an ASK modulation scheme). In some embodiments, optical transmitter 10 generates digital pulse output light signals 22 at bit rates ranging from approximately 1 gigabit per second (Gb/sec) up to ~50 Gb/sec over a wide range of operating temperatures.

Figure 2:
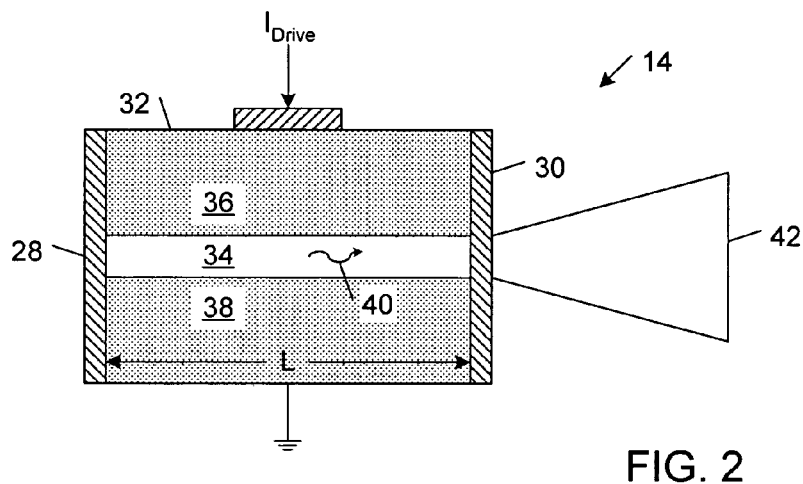
FIG. 2 is a diagrammatic view of an implementation of the Fabry-Perot laser of FIG. 1.

FIG. 2 shows an implementation of the FP laser 14 that includes first and second reflectors 28, 30 that define a resonant optical cavity 32. The resonant optical cavity 32 contains an active region 34 interposed between first and second cladding regions 36, 38. In the illustrated implementation, the first cladding region 36 is a layer of semiconductor material doped p-type, the second cladding region 38 is a layer of semiconductor material doped n-type, and the active region 34 is a layer of undoped semiconductor material. When a drive current ($I_{Drive}$) is applied to the FP laser 14, electron-hole pairs in the active region 34 combine to generate light 40. In some implementations, the active region 34 includes one or more quantum wells, which tailor the characteristics of the light 40 generated in the active region 34. The first and second reflectors 28, 30 are typically cleaved facets of semiconductor material. The reflectivities of these facets may be modified by incorporating one of more coatings on the facet surfaces. In the illustrated embodiment, the reflector 28 is 100% reflective of light 40 and the reflector 30 is partially reflective of light 40 so that polarized output light 42 exits the edge of the FP laser 14 corresponding to the partially reflective reflector 30.

Figures 3A, 3B:
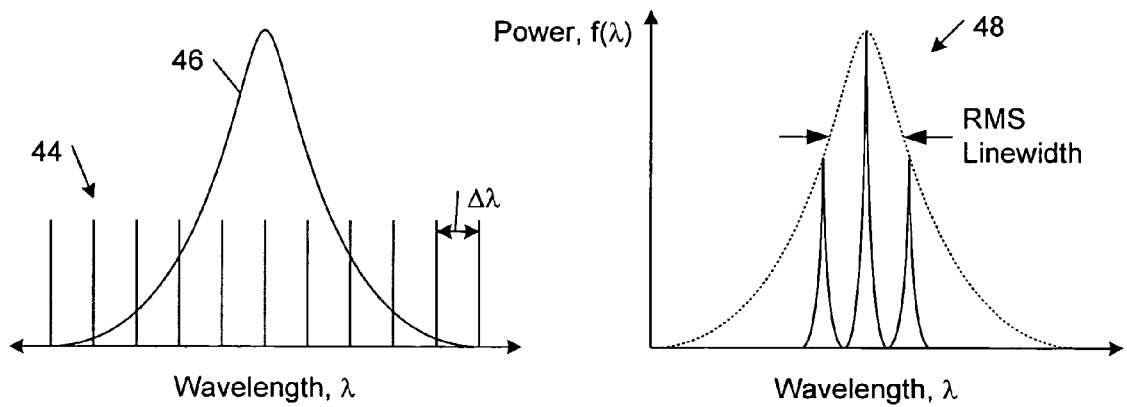
FIG. 3A is a graph of a set of exemplary optical longitudinal modes and an exemplary gain profile plotted as a function of wavelength for the Fabry-Perot laser implementation of FIG. 2.
FIG. 3B is a graph of the optical power spectrum plotted as a function of wavelength for the exemplary Fabry-Perot laser implementation of FIG. 3A.

The resonant optical cavity 32 limits light oscillation to a discrete set of evenly-spaced longitudinal optical modes 44 shown in FIG. 3A. The wavelength mode spacing ($\Delta\lambda$) of the output light 42 is given by $\Delta\lambda = c(2nL)^{-1}$, where c is the velocity of light, L is the length of cavity 32 and n is an effective refractive index of the medium for light propagation and has a value greater than 1. The active region 34 is characterized by a gain versus wavelength function 46, which results in the amplification of only a limited number of optical modes 44 (e.g., 3-30 modes) within a relatively narrow wavelength band. The power spectrum 48 of the output light 42 generated by FP laser 14 is shown in FIG. 3B. The power spectrum 48 of the output light 42 is characterized by a root-mean-square ($\sigma_{RMS}$) linewidth given by equation (1):

$$\sigma_{RMS} = \sqrt{\langle\lambda^2\rangle - \langle\lambda\rangle^2} \tag{1}$$

where $$\langle\lambda\rangle = \sum_{i \in S} \lambda_i \rho(\lambda_i) \tag{2}$$

and $$\langle\lambda^2\rangle = \sum_{i \in S} \lambda_i^2 \rho(\lambda_i) \tag{3}$$

where $\lambda_i$ is the wavelength of the output light 42 corresponding to the $i^{th}$ spectral component of the power spectrum 48, S is a spectral window centered at the wavelength corresponding to the peak output power of the output light 42, and $\rho(\lambda_i)$ is the normalized spectral component of the power spectrum 48 at the wavelength $\lambda_i$ and is given by equation (4):

$$\rho(\lambda_i) = \frac{f(\lambda_i)}{\sum_{i \in S} f(\lambda_i)} \quad (4)$$

where $f(\lambda_i)$ is the power of the output light 42 at the wavelength $\lambda_i$. Although equations (1)-(4) define the RMS linewidth in terms of the discrete power spectrum 48, the RMS linewidth of the power spectrum also may be defined in terms of a continuous power spectrum in an analogous way.

Maintaining a relatively narrow spectral linewidth (though still not a single-mode spectrum) enables the optical transmitter 10 to reliably transmit output light signals 22 over longer distances. In some implementations, the RMS linewidths of the spectral distribution 48 are at most 3 nanometers (nm). In some of these implementations, the RMS linewidths of the spectral distribution 48 are at most 1 nm. The optical power of output light 42 is set based on the number (N) of optical outputs in optical transmitter 10, where the optical power increases with N.

Figure 4:
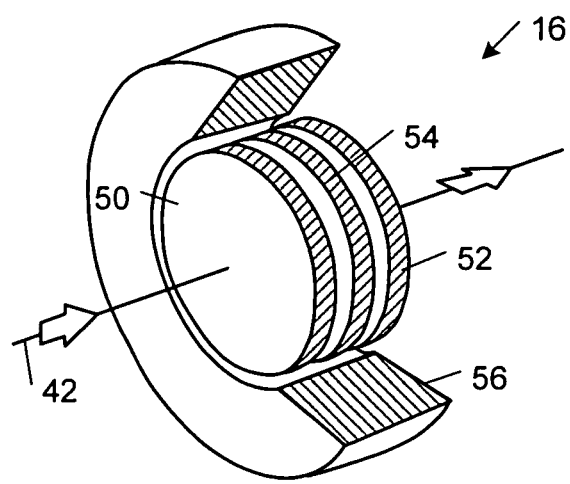
FIG. 4 is a diagrammatic view of an implementation of the optical isolator of FIG. 1.

FIG. 4 shows an embodiment of optical isolator 16 that includes a pair of polarizers 50, 52 and a Faraday rotator 54 interposed between the polarizers 50, 52. In some implementations, the polarizers 50, 52 are birefringent prisms or polarizing beam splitters, and the Faraday rotator 54 is a magnetic garnet crystal. An annular permanent magnet 56 surrounds and applies a magnetic field to the Faraday rotator 54. In the illustrated embodiment, the polarizer 50 has a polarization axis that is oriented parallel to the polarization direction of the light 42 received from FP laser 14, the Faraday rotator 54 rotates the polarization of the light 45°, and the polarizer 52 has polarization axis that is oriented parallel to the polarization direction of the rotated light received from the Faraday rotator 54. In this way, the polarized output light 42 received from FP laser 14 passes through the optical isolator 16 without substantial amplitude reduction. Back-reflected light, on the other hand, has passed through the Faraday rotator 54 twice by the time it reaches the polarizer 50. Therefore, such back-reflected light has an orthogonal polarization relative to the polarization axis of the polarizer 50. For this reason, such back-reflected light is substantially blocked by the optical isolator 16. By preventing backreflections from reaching the FP laser 14, the optical isolator 16 prevents spectral broadening of the output light signals 22 that otherwise would occur. In the illustrated embodiment, the polarization axis of polarizer 52 is oriented at an angle of 45° relative to the polarization axis of polarizer 50 and the electroabsorption modulator 18 is polarization-independent. In another embodiment, the optical isolator 16 is a polarization-maintaining isolator, in which the input and output polarization states are parallel. In this other embodiment, the electroabsorption modulator 18 may be polarization-independent or polarization-dependent (e.g., TE mode only).

Figure 5:
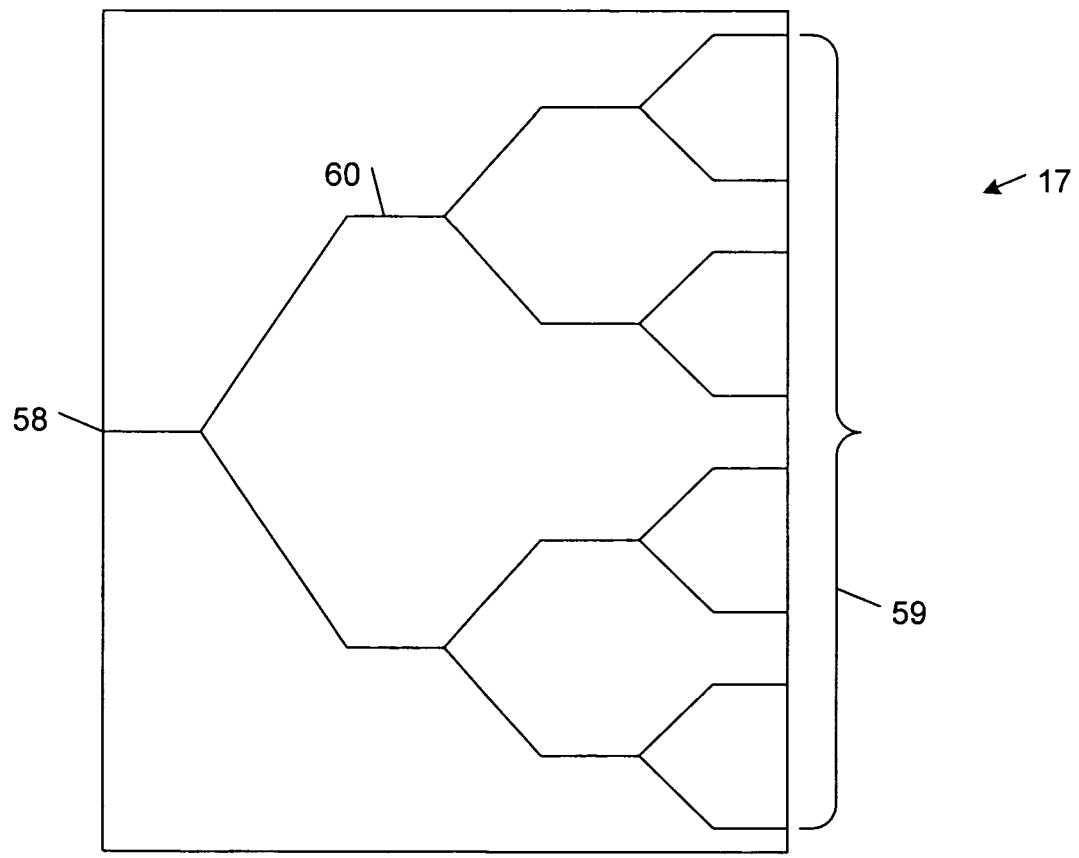
FIG. 5 is a diagrammatic top view of an implementation of the optical splitter of FIG. 1.

FIG. 5 shows an embodiment of the optical splitter 17 that has an optical input 58, multiple optical outputs 59, and multiple optical paths 60 coupling the optical input 58 to the optical outputs 59. The optical input 58 receives the multimode laser light transmitted by the optical isolator 16. The optical paths 60 extending from the optical input 58 to the optical outputs 59 respectively transmit these optical signals from the optical input 58 to the optical outputs 59. As the multimode laser light propagates through the optical paths 60, the multimode laser light is divided into respective ones of the multiple light outputs. In general, the optical paths 60 may be implemented using any type of optical waveguide technology. In the illustrated embodiment, the lengths of the optical paths 60 from the optical input 58 to the optical outputs 59 are substantially the same.

The optical splitter 17 may be polarization independent or it may exhibit some polarization dependence depending on the arrangement of the components of optical transmitter 10. In some implementations, M (1×N)-optical splitters are connected to a single optical input by intermediate optical waveguides or optical fiber splitters to form a 1×(M·N) optical splitter, where M has an integer value greater than 1.

Figure 6:
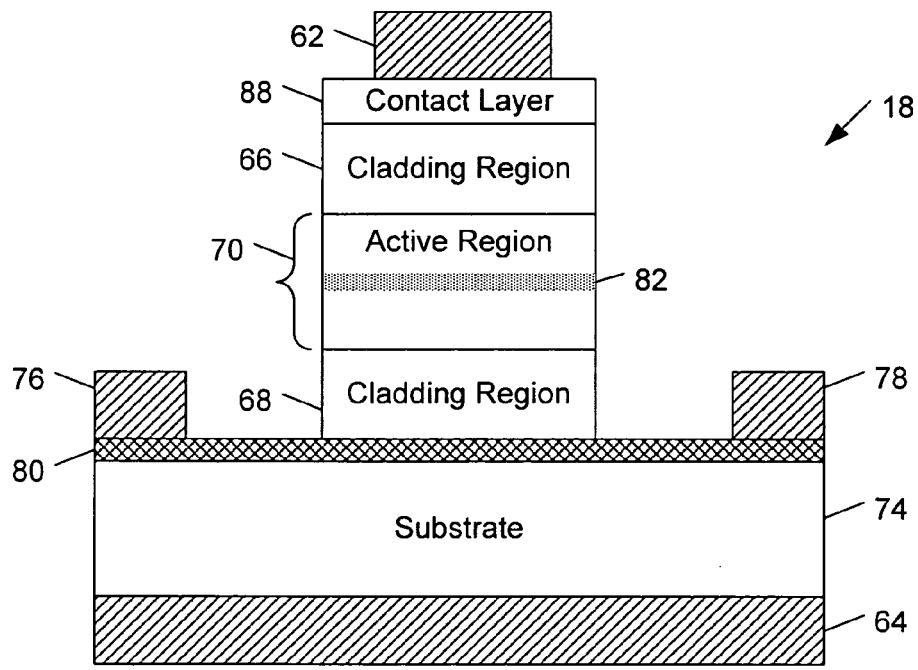
FIG. 6 is a diagrammatic side view of one possible implementation of embodiment of one of the electroabsorption modulators of FIG. 1.

FIG. 6 shows an embodiment of an electroabsorption modulator 18 that includes first and second electrodes 62, 64, first and second cladding regions 66, 68, and an active region 70.

Figure 7A:
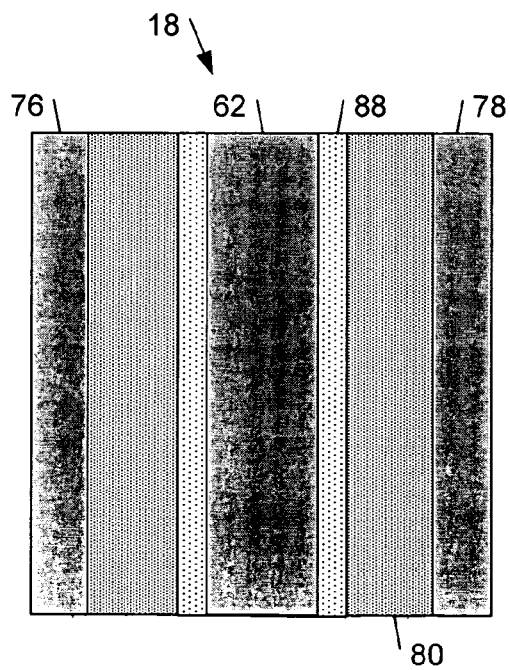
FIG. 7A is a top view of an implementation of the electroabsorption modulator embodiment of FIG. 5 that has a signal electrode formed from a continuous strip of electrically conductive material.
Figure 7B:
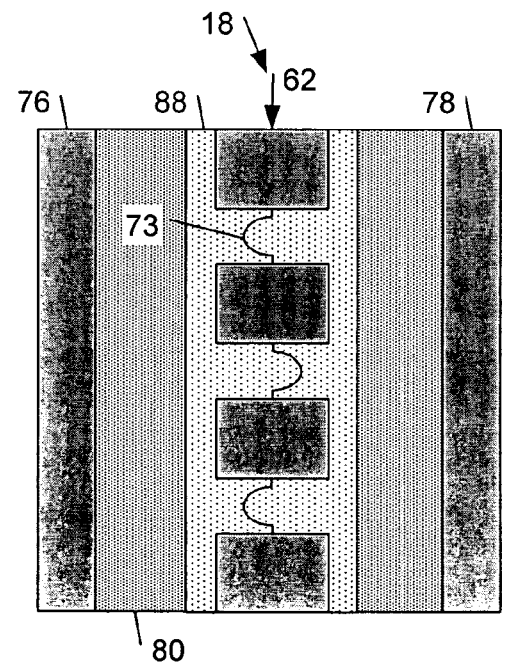
FIG. 7B is a top view of an implementation of the electroabsorption modulator embodiment of FIG. 6 that has a signal electrode formed from multiple spaced-apart electrode segments of electrically conductive material that are connected in series by inter-stage microstrip lines.

The first and second electrodes 62, 64 include one or more metal layers. In one exemplary embodiment, each of the first and second electrodes 62, 64 includes an underlying layer of titanium, which promotes adhesion and forms an ohmic contact interface between the electrodes 62, 64 and the supporting semiconductor material, and an overlying layer of gold that forms electrical contacts for the electroabsorption modulator 18. In the illustrated embodiment, the first (or signal) electrode 62 is a traveling-wave signal electrode formed from a continuous strip of electrically conductive material, as shown in FIG. 7A, or from multiple spaced-apart electrode segments of electrically conductive material that are connected in series, with each pair of signal electrode segments connected by a respective inter-stage microstrip line 73, as shown in FIG. 7B.

In some implementations, the first and second electrodes 62, 64 are connected to input and output bonding pads by respective microstrip lines. The in-put bonding pad is connected to a drive circuit by a first bonding wire and the output bonding pad is connected to an external termination load through a second bonding wire. The electro-absorption modulator 18, the input and output bonding pads, and the input and output microstrip lines are fabricated on the same substrate 74 (e.g., a wafer of semiconductor material, such as InP or GaAs). The external termination load is any suitable termination load, such as a resistor. The termination load and the drive circuit typically are impedance-matched to reduce reflections and maximize the electrical voltage that can be delivered across the active region 70 of the electro-absorption modulator 18.

In the illustrated embodiment, the substrate 74 is electrically insulating and the electroabsorption modulator 18 and first and second metal film transmission lines 76, 78 are formed on an electrically conducting semiconductor layer 80 (e.g., n++InGaAs or n++InGaAsP), which is formed on the substrate 74. In other embodiments, the substrate 74 is electrically conducting, and the electroabsorption modulator 18 and the transmission lines 76, 78 are formed directly on the substrate 74.

Each of the first and second cladding regions 66, 68 and the active region 70 includes one or more semiconductor layers. In the illustrated embodiment, the first and second cladding regions 66, 68 are doped p-type and n-type, respectively, while the active region is undoped and, therefore, contains a relatively small amount of impurities (e.g., less than about $5 \times 10^{15}$ cm$^{-3}$). The first and second cladding regions 66, 68 are formed of material compositions that have lower refractive indices than the material composition of the active region 70. In this way, the cladding regions 66, 68 and the active region 70 operate as a waveguide for light traveling through the electroabsorption modulator 18. The active region 70 includes a light absorption region 82 that includes at least one quantum well with a conduction band alignment and a valence band alignment that create bound electron and hole states that are involved in the electro-absorption process.

Figure 7C:
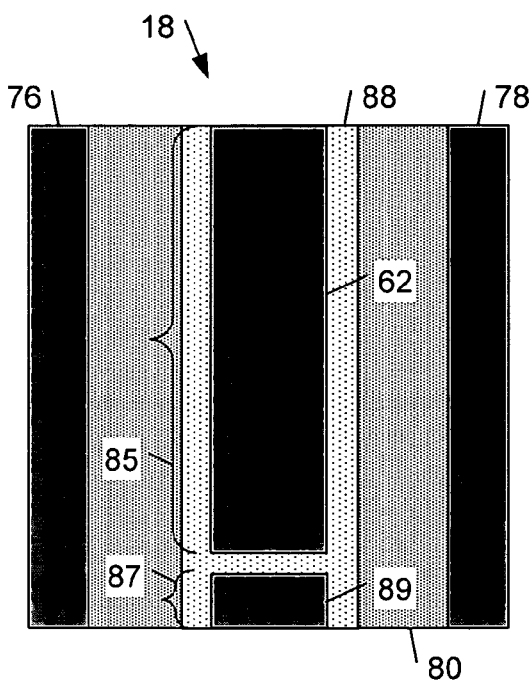
FIG. 7C is a top view of an implementation of the electroabsorption modulator embodiment of FIG. 6 that has a signal electrode and a leveling electrode for adjusting the power level of an optical signal output from the electroabsorption modulator.

FIG. 7C shows a top view of an implementation of the electroabsorption modulator 18 that includes a signal electrode portion 85 that includes signal electrode 62 and a power-leveling portion 87 that includes a leveling electrode 89. The signal electrode 62 and the leveling electrode 89 are electrically isolated from one another. The signal electrode 62 is connected electrically to a modulation signal generator, which generates signals for controlling the modulation of optical signals traveling through the electroabsorption modulator 18. The leveling electrode 89 is connected electrically to a power level controller, which applies to the leveling electrode 87 a voltage that regulates the optical power level output by the electroabsorption modulator 18. In some implementations, the power level controller monitors the optical power levels output from the channels of the optical transmitter 10 and adjusts the voltages applied to the leveling electrodes 87 of the electroabsorption modulators 18 so that optical power output levels from all of the channels are substantially the same.

The implementation of electroabsorption modulator 18 shown in FIG. 6 corresponds to a ridge-type waveguide structure. In other embodiments, the electroabsorption modulator 10 may be implemented by different types of waveguide structures. For example, in some embodiments, the electroabsorption modulator 18 includes a buried heterostructure.

Figure 8:
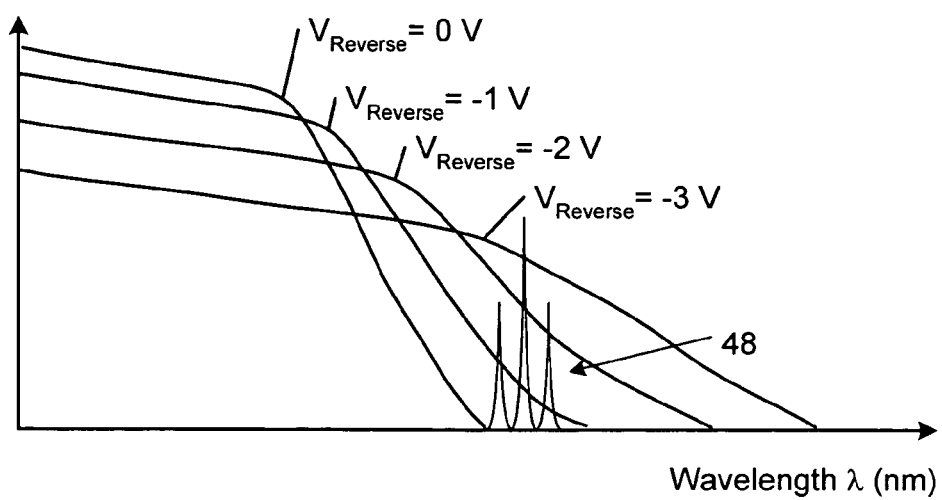
FIG. 8 is an illustrative graph of the absorption coefficient of the electroabsorption modulator implementation of FIG. 6 plotted as a function of wavelength for different bias conditions.

FIG. 8 shows a graph of the absorption spectrum of a typical electroabsorption modulator 18 under different bias conditions and the output spectrum 48 of the FP laser 14. As shown in FIG. 8, the absorption edge (corresponding to the "knee" in the absorption spectrum curves) of the electroabsorption modulator 18 moves to longer wavelengths with increasing applied reverse bias ($V_{Reverse}$). In some implementations, the zero-bias ($V_{Reverse}=0$) absorption edge wavelength of the electroabsorption modulator 18 is designed to be shorter than a specified target wavelength (e.g., the dominant peak) in the output spectrum 48 to be modulated. For example, in one exemplary implementation, the zero-bias ($V_{Reverse}=0$) absorption edge wavelength of the given electroabsorption modulator 18 is approximately 50-70 nm shorter than a specified target laser wavelength of approximately 1555 nm. As the reverse bias applied to the electroabsorption modulator 18 increases, the absorption edge wavelength shifts to longer wavelengths and the optical signal 22 emitted from the electroabsorption modulator 18 is reduced. The ratio of the "on" state to the "off" state is referred to as the extinction ratio of the electroabsorption modulator 18.

Figure 9:
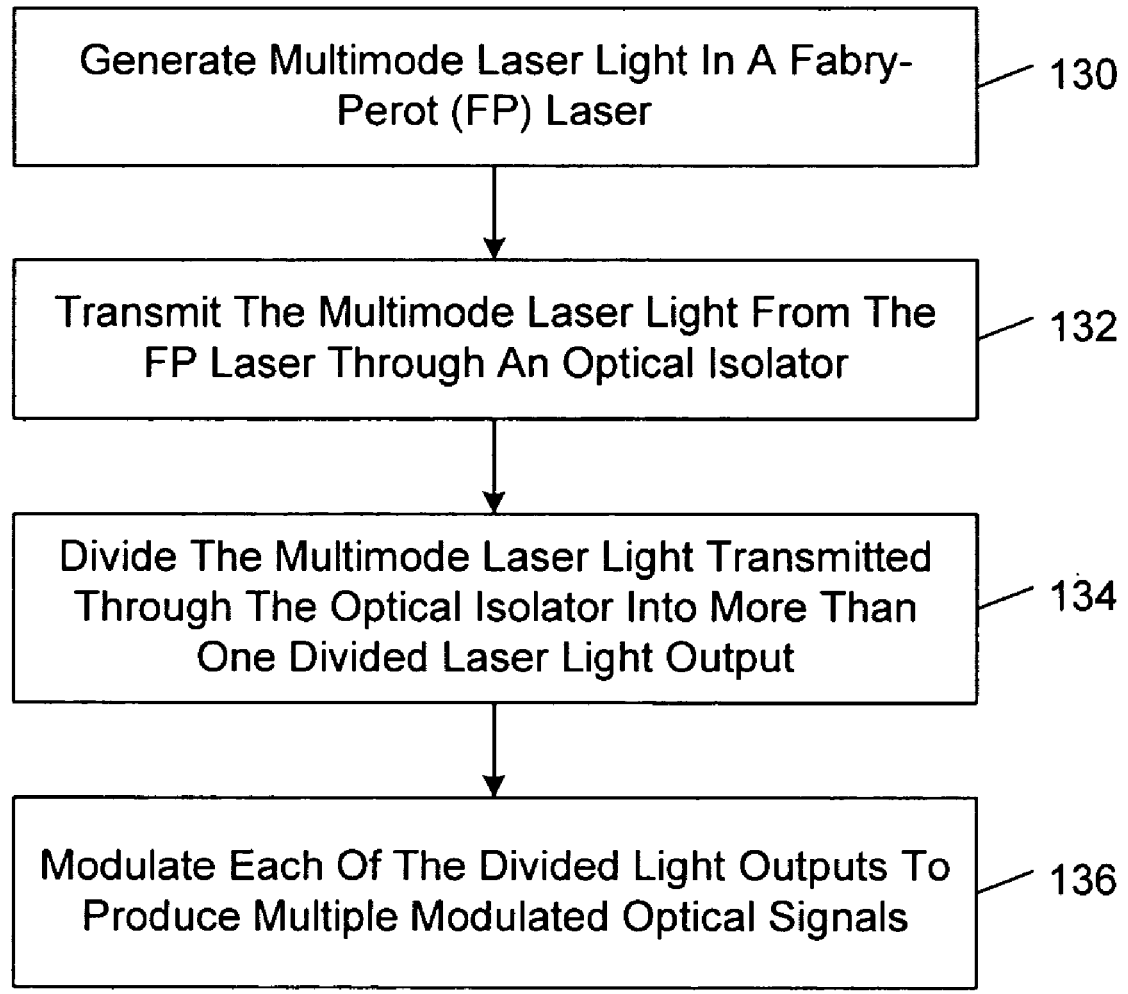
FIG. 9 is a flow diagram of an embodiment of a method of generating multiple modulated optical signals.

FIG. 9 shows an embodiment of a method that is implemented by optical transmitter 10 to generate multiple modulated optical signals. In accordance with this method, multimode laser light is generated in Fabry-Perot (FP) laser 14 (block 130). The multimode laser light is transmitted from the FP laser 14 through optical isolator 16 (block 132). The multimode laser light transmitted through the optical isolator 16 is divided into more than one laser light output (block 134). Each of the divided light outputs is modulated to produce multiple modulated output light signals 22 (block 136).

The optical isolation provided by the optical isolator 16 renders the optical transmitter 10 substantially immune to any reflections originating beyond the optical isolator 16. The spectrum and the amplitude of the output optical signal 22 are determined primarily by the ambient temperature, the drive current to the laser 14 and the voltages applied to the electroabsorption modulator array 19. The temperature dependence of the output signal 22 is substantially eliminated by designing the FP laser 14 and the electroabsorption modulators 18 so that they have output wavelength and absorption edge temperature coefficient parity while sharing a mutual thermal environment.

In some implementations, the FP laser 14 and the electroabsorption modulators 18 are designed so that the FP laser 14 has an output wavelength temperature coefficient that is substantially equal to the absorption edge wavelength temperature coefficient of the electroabsorption modulators 18. For example, in some implementations, the output wavelength temperature coefficient of the FP laser 14 and the absorption edge wavelength temperature coefficient of the electroabsorption modulators 18 are substantially equal (i.e., they differ by at most ±25%). In some implementations, this temperature coefficient parity is achieved by forming the FP laser 14 and the electroabsorption modulators 18 of materials selected from the same semiconductor material family. As used herein, the term "semiconductor material family" refers to a group of semiconductor materials that are composed of, for example, two or more members of a discrete set of elemental atoms (e.g., Group III and Group V elemental atoms) suitable for forming an epitaxial thin film on a compatible substrate. Exemplary semiconductor material families include: $In_xGa_{1-x}As_yP_{1-y}$ on an InP substrate, where $0 \leq x \leq 1$ and $0 \leq y \leq 1$; $Al_yGa_yIn_{1-x-y}As$ on an InP substrate, where $0 \leq x \leq 1$ and $0 \leq y \leq 1$; $In_xGa_{1-x}As$ on a GaAs substrate, where $0 \leq x \leq 1$; and $Al_xGa_{1-x}As$ on a GaAs substrate, where $0 \leq x \leq 1$.

In addition to output wavelength and absorption edge temperature coefficient parity, the FP laser 14 and the electroabsorption modulators 18 share a mutual thermal environment such that the FP laser 14 and the electroabsorption modulators 18 are at substantially the same temperature throughout the range of operating conditions specified for the optical transmitter 10. For example, in some implementations, the FP laser 14 and the electroabsorption modulators 18 differ in temperature by at most 15 degrees Celsius (° C.) over an operating temperature range of 20° C. to 90° C.

As explained in detail below, the components of optical transmitter 10 may be packaged separately but are contained within a shared thermal environment, or the components of optical transmitter 10 may be packaged in a single package that defines a shared thermal environment.

Figure 10:
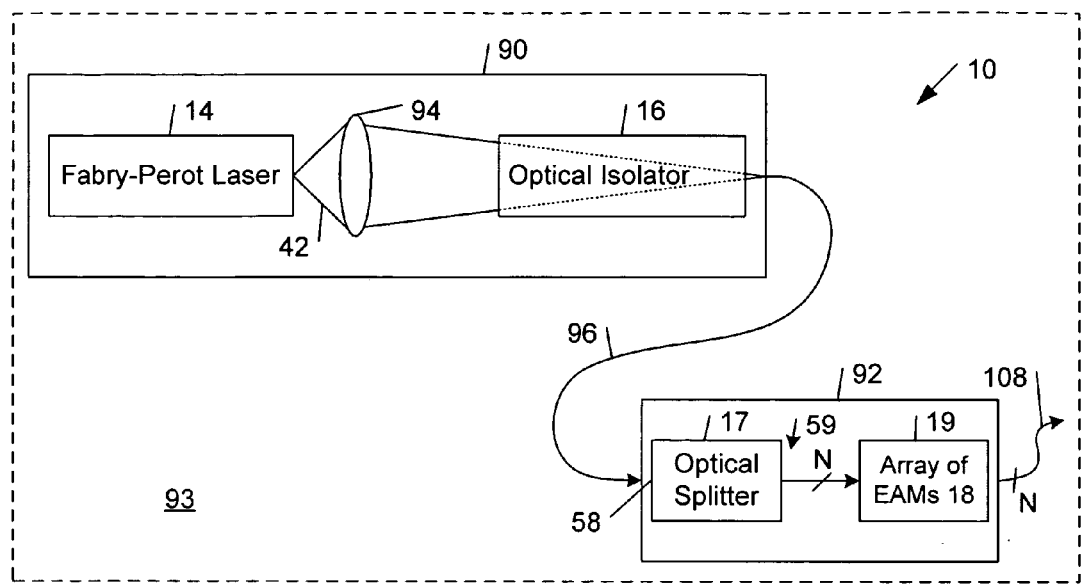
FIG. 10 is a block diagram of an implementation of the optical transmitter of FIG. 1.

FIG. 10 shows an implementation of the optical transmitter 10 in which the Fabry-Perot laser 14 and the optical isolator 16 are contained within an optoelectronic package 90, and the optical splitter 17 and the array 19 of electroabsorption modulators 18 are contained within a separate optoelectronic package 92. Both optoelectronic packages 90, 92 are contained within a shared thermal environment 93. A lens element 94 (e.g., a refractive lens or a diffractive lens) focuses the output light 42 from the FP laser 14 through the optical isolator 16 and onto the end of a single mode optical fiber 96, which is typically retained in optoelectronic package 90 by a ferrule. In some implementations, the FP laser 14, the lens element 94, and the optical isolator 16 are mounted on the same substrate within the first optoelectronic package 90. Optical bench alignment techniques are used to align these components before they are secured to the substrate. The FP laser 14 electrically connects to a drive circuit through an electrical interface on the package 90.

The output end of the optical fiber 96 is coupled to the input 58 of the optical splitter 17. The outputs 59 of the optical splitter 17 are coupled to the inputs of the EAMs 18. The N outputs of the EAMs 18 are coupled to the inputs of an N-channel optical fiber array 108. In some implementations, the optical splitter 17 and the EAMs 18 are mounted on the same substrate within the second optoelectronic package 92.

Optical bench alignment techniques are used to align these components before they are secured to the substrate. In some implementations, the EAMs 18 are polarization-independent and the optical fiber 96 is a standard single mode optical fiber. In other implementations, the optical fiber 96 is a polarization-preserving optical fiber, in which case the EAMs 18 may or may not be polarization-independent.

In some implementations, the first and second optoelectronic packages 90, 92 are mounted on the same printed circuit board (e.g., a motherboard or a daughterboard), which is contained in an enclosure of an optical data transmission system that defines the shared thermal environment 93. In other implementations, the first and second optoelectronic packages 90, 92 are mounted on different printed circuit boards that are contained in an enclosure of an optical data transmission system that defines the shared thermal environment 93. In one exemplary implementation of this type, one of the first and second optoelectronic packages 90, 92 is mounted on a motherboard and the other optoelectronic package is mounted on a daughterboard connected to the motherboard in the optical data transmission system enclosure. In another exemplary implementation of this type, the first and second optoelectronic packages 90, 92 are mounted on different respective daughterboards that are connected to the same motherboard in the optical data transmission system enclosure. In these implementations, the first and second optoelectronic packages are decoupled from any direct active temperature-regulating devices.

Figure 11:
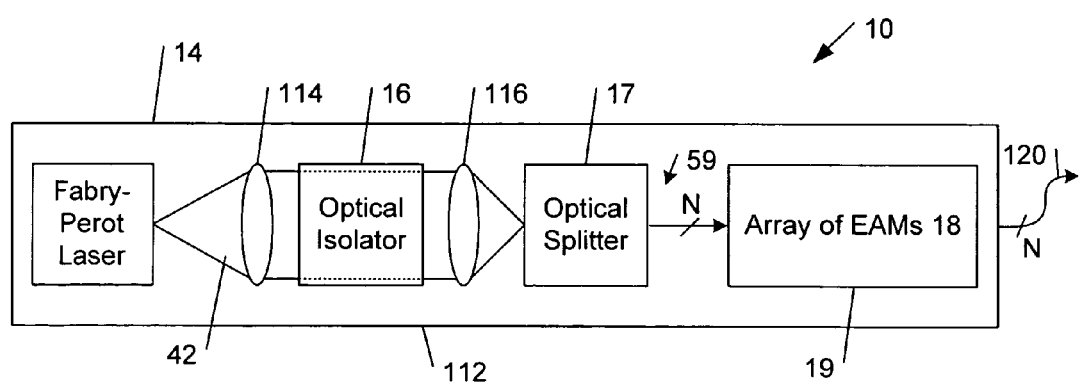
FIG. 11 is a block diagram of an implementation of the optical transmitter of FIG. 1.
Figure 12:
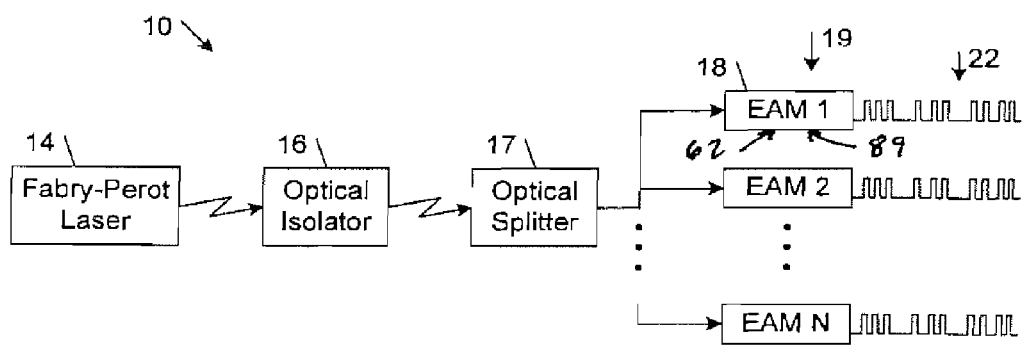
FIG. 12 is a block diagram of an embodiment of an optical transmitter that includes a Fabry-Perot laser, an optical isolator, an optical splitter, an array of electroabsorption modulators, a signal electrode, and a leveling electrode.

FIG. 11 shows an implementation of the optical transmitter 10 in which the Fabry-Perot laser 14, the optical isolator 16, the optical splitter 17, and the array 19 of electroabsorption modulators 18 are contained within the same optoelectronic package 112, which defines a shared thermal environment for the optical transmitter components. A lens element 114 (e.g., a refractive lens or a diffractive lens) collimates the output light 42 from the FP laser 14. The collimated light passes through the optical isolator 16. A lens element 116 (e.g., a refractive lens or a diffractive lens) focuses the light output from the optical isolator 16 onto the input of the optical splitter 17. The electroabsorption modulators 18 receive the N divided portions of light from the outputs 59 of the optical splitter 17. In some implementations, the FP laser 14, the lens elements 114, 116, the optical isolator 16, the optical splitter 17, and the electroabsorption modulators 18 are mounted on the same substrate within the optoelectronic package 112. Optical bench alignment techniques are used to align these components before they are secured to the substrate. An N-channel optical fiber array 120, which is retained in the optoelectronic package 112 by a ferrule, carries the output optical signals 22 from the output of the electroabsorption modulators 18. The FP laser 14 and electroabsorption modulators 18 may be connected electrically to one or more drive circuits through respective electrical interfaces.

As a result of the above-described output wavelength and absorption edge temperature coefficient parity and the shared thermal environment, the relative wavelength offset between the center of the FP laser output spectrum 48 and the zero-bias absorption edge wavelength of the electroabsorption modulators 18 is substantially constant over a relatively wide temperature range (e.g., 20° C. to 90° C.). As a result, the insertion losses of the electroabsorption modulators 18 do not shift substantially with temperature since the respective band edges track and the optical output amplitude and the extinction ratio for a given electroabsorption modulator bias and signal amplitude are substantially temperature-independent.

The multimode spectrum of the output light signals 22 produced by optical transmitter 10 limits the distance over which the output light signals 22 can propagate. The relatively broad spectrum of the modulated output light signals 22 still may be used over a range of useful distances for a number of practical optical data transmission applications. For example, output optical signals 22 with data rates up to approximately 40 Gb/s are able to propagate up to approximately twenty meters on multimode optical fibers using, for example, an FP laser spectrum having an RMS linewidth of a 2 nm, 0 dBm of launched optical power, and a suitable receiver sensitivity. Among the applications for such short-distance high-speed data transmissions are communications between computer chips, between printed circuit boards within a data transmission system, between back-planes, and between racks of separate data transmission systems.

Other embodiments are within the scope of the claims.

What is claimed is:

1. An optical transmitter, comprising:
 a Fabry-Perot (FP) laser operable to generate multimode laser light;
 an optical isolator arranged to transmit the multimode laser light;
 an optical splitter having more than one optical output and an optical input arranged to receive the multimode laser light transmitted by the optical isolator; and
 electroabsorption modulators (EAMs) each operable to modulate a respective laser light output from a respective optical output of the optical splitter, wherein the multimode laser light has a power spectrum characterized by a root-mean-square linewidth of at most 3 nm and wherein the FP laser has a wavelength temperature coefficient, and each of the EAMs has an absorption edge temperature coefficient equal to the wavelength temperature coefficient within +/−25% over an operating temperature range specified for the optical transmitter.

2. The optical transmitter of claim 1, wherein the multimode laser light has a power spectrum characterized by a root-mean-square linewidth of at most 1 nm.

3. The optical transmitter of claim 1, wherein the FP laser and the EAMs are fabricated of materials selected from a mutual semiconductor material family.

4. The optical transmitter of claim 1, wherein the optical transmitter is decoupled from any direct active temperature-regulating device.

5. The optical transmitter of claim 1, wherein the FP laser and the EAMs share a mutual thermal environment.

6. The optical transmitter of claim 1, wherein each EAM has a signal electrode for receiving a modulation drive signal and a leveling electrode for receiving a power level control signal.

7. The optical transmitter of claim 1, further comprising:
 a first optoelectronic package containing the FP laser and the optical isolator;
 a second optoelectronic package containing the optical splitter and the EAMS; and
 a single mode optical fiber connecting the first and second optoelectronic packages.

8. The optical transmitter of claim 7, wherein the optical fiber is polarization-preserving.

9. The optical transmitter of claim 1, further comprising an optoelectronic package containing the FP laser, the optical isolator, the optical splitter, and the EAMs.

10. A method of generating multiple modulated optical signals, comprising:
 generating multimode laser light by a Fabry-Perot (FP) laser;

directionally isolating the multimode laser light;

dividing the directionally-isolated multimode laser light into more than one divided laser light output; and modulating each of the divided laser light outputs by an electroabsorption modulator (EAM) to produce multiple modulated optical signals, wherein the multimode laser light has a power spectrum characterized by a root-mean-square linewidth of at most 3 nm, and wherein the generating is characterized by a first wavelength temperature coefficient, and the modulating is characterized by a second wavelength temperature coefficient equal to first wavelength temperature coefficient within +/−25% over a specified operating temperature range.

11. The method of claim 10, wherein the multimode laser light has a power spectrum characterized by a root-mean-square linewidth of at most 1 nm.

12. The method of claim 10, wherein the generating and the modulating are performed in a mutual thermal environment.

13. The method of claim 12, wherein the mutual thermal environment is decoupled from any direct active temperature-regulating device.

14. The method of claim 12, wherein the generating and the modulating are performed in a common optoelectronic package.

15. The method of claim 10, further comprising transmitting the directionally-isolated multimode laser light before the dividing.

16. The method of claim 10, further comprising controlling the modulating of each divided laser light output so that the modulated optical signals have substantially equal optical power levels.

* * * * *